R. H. BRYANT.
COTTON CHOPPER.
APPLICATION FILED AUG. 23, 1911.
1,033,150.
Patented July 23, 1912.
2 SHEETS—SHEET 1.
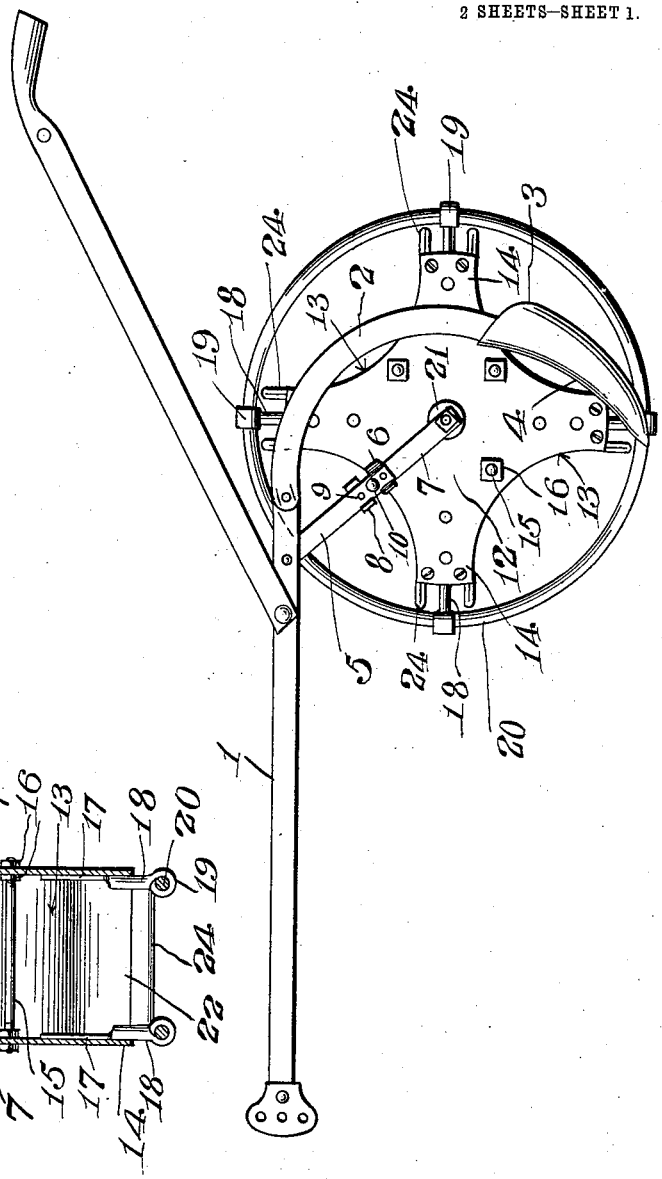
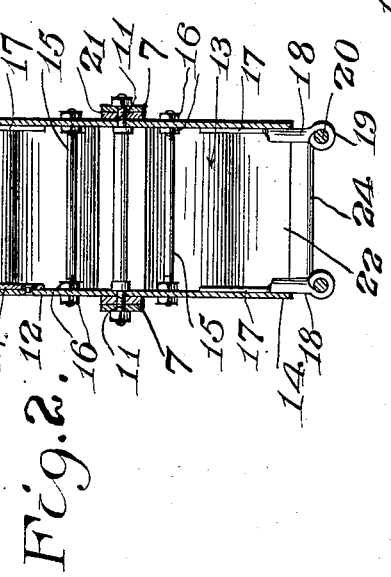
Witnesses
Inventor
R. H. Bryant

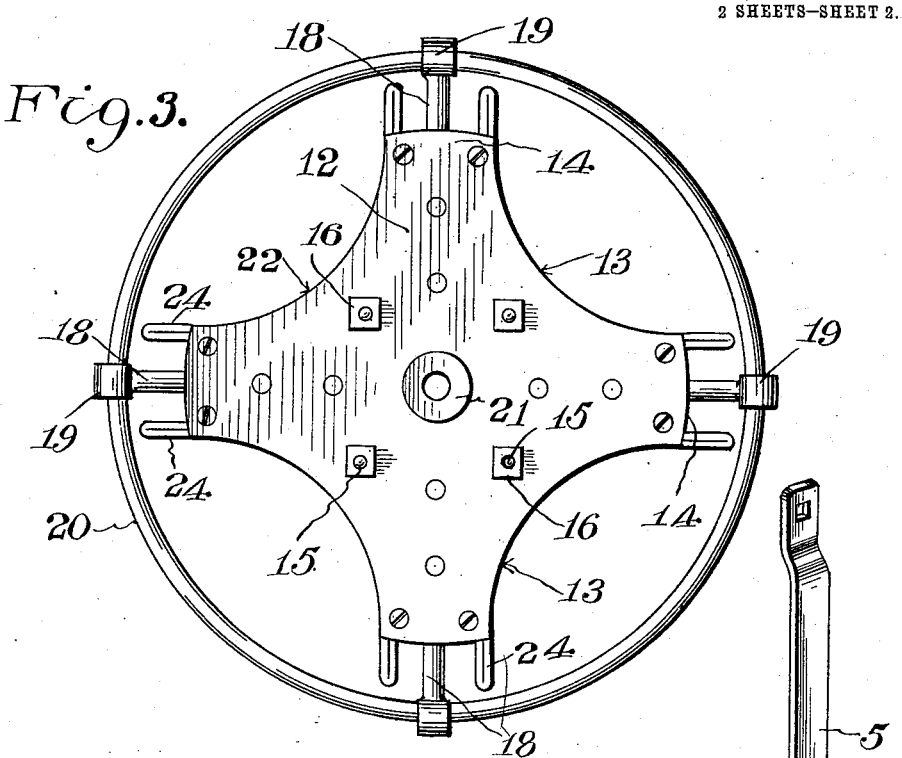
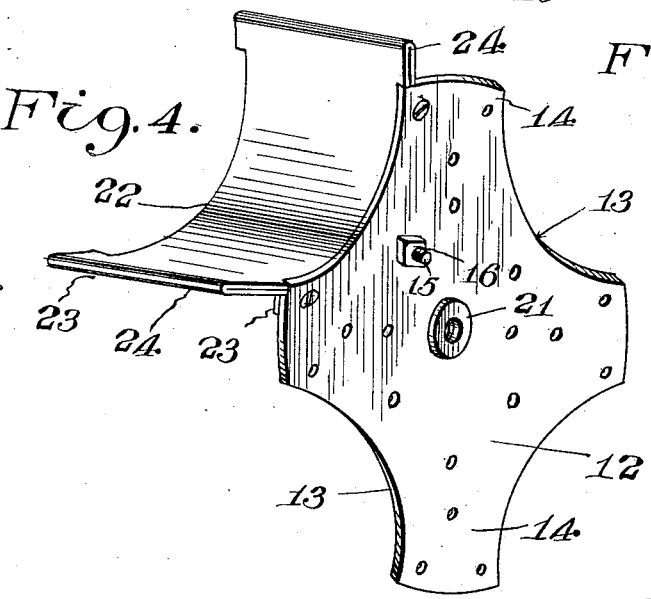
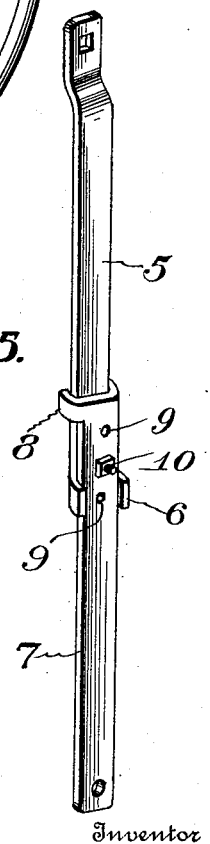

UNITED STATES PATENT OFFICE.

ROBERT H. BRYANT, OF SHAWNEE, OKLAHOMA.

COTTON-CHOPPER.

1,033,150.  Specification of Letters Patent.  Patented July 23, 1912.

Application filed August 23, 1911. Serial No. 645,543.

*To all whom it may concern:*

Be it known that I, ROBERT H. BRYANT, a citizen of the United States, residing at Shawnee, in the county of Pottawatomie and State of Oklahoma, have invented certain new and useful Improvements in Cotton-Choppers, of which the following is a specification.

My invention relates to improvements in cotton choppers, and has for its leading object the provision of an improved device which may be readily attached to an ordinary cultivator, and which will serve to protect certain of the plants disposed the desired distance apart to prevent the dirt from covering the said plants while permitting the dirt to cover and kill the intermediate cotton plants or weeds.

The further object of my invention is the provision of an improved device of this character for automatically spacing the plants which are to be developed while permitting the destruction of the intermediate plants and to allow of sufficient soil being thrown against the plants to be cultivated to cover the grass or weeds adjacent the said plants and thus to tend to destroy the said grass and weeds.

Other objects and advantages of my improved cotton chopper will be readily apparent by reference to the following description taken in connection with the accompanying drawings and it will be understood that I may make any modifications in the specific structure shown and described within the scope of my claims without departing from or exceeding the spirit of my invention.

Figure 1 represents a side elevation of my device applied to an ordinary cultivator illustrating the operation of invention. Fig. 2 is a vertical sectional view of the chopper. Fig. 3 represents an enlarged side elevation of the invention removed from the cultivator. Fig. 4 represents a view of one of the arcuate protector and spacing plates, and Fig. 5 represents a perspective view of one of the adjustable bars for securing my device to the cultivator.

In the drawings, the numeral 1 designates the beams of an ordinary cultivator having depending therefrom the standards 2 for the cultivator shares 3 having mold board portions 4 so disposed as to throw the soil loosened by the cultivator inward against the plants of the row disposed between the two shares. Secured to the said beams 1 are the bars 5 having at one end the inturned flanges or ears 6 embracing the second bar 7 likewise having ears 8 said bars each having a plurality of apertures 9 formed therein to receive a bolt 10, the engagement of the bolt in different apertures securing the bars in desired relatively adjusted position. Said bars have bearings formed at their lower ends to receive the ends of the axle 11 of my improved cotton chopper. Said cotton chopper comprises a pair of side plates 12 which are substantially cruciform, the plates having curved edges 13 connecting the various arms 14. Passing through the plates 12 near the center of the arcuate edges 13 are the bolts 15 having nuts 16 engaged thereon and clamped against the inner and outer faces of the plates 12 to secure the said plates in desired position with respect to each other.

Secured centrally to each of the arms 14 is the flattened portion 17 of a rod 18, said rods having flattened outer ends 19 which are curved around and preferably welded to the heavy rings 20 which form the wheels or rims upon which my device rotates. It will thus be seen that the plates 12 and rods 18 together form the spokes of the wheels, the ends of the arms 14 being spaced a distance from the rims 20 and consequently being held a distance above the surface over which my device travels, the plates having bearing blocks 21 secured thereto in which the axle is rotatably engaged.

In order to enable my device to satisfactorily protect those plants which are disposed at the points where the rods strike the soil upon rotation of the device, while allowing the soil to cover the plants and weeds intermediate said plants, I employ my improved protector plates 22. Said plates are of arcuate form and of curvature corresponding to the curve of the edges 13 and have the side flange portions 23 adapted to be secured to the plates 12 along the said edges 13. Said plates have projecting reinforced ends 24 extending outward to the rims of the device.

By reference to the drawings the operation of my improved cotton chopper will be readily understood, and it will be seen that as the cultivator moves over the ground, the chopper will roll along and will engage certain of the plants in the row in the space between adjacent ends 24 of two of the arcuate plates, the soil thrown by the cultivator shares striking against the front arcuate plate which prevents the soil from covering the plants projecting into my device while allowing said soil to cover those plants between the two ends of each plate. On account, however, of the fact that the arms 14 do not extend entirely to the rims of my device, a certain amount of soil turned by the cultivator shares will pass in at the sides and will serve to cover the small grass and weeds without interfering with the cotton plants which it is desired to preserve.

From the foregoing description taken in connection with the accompanying drawings the construction and operation of my improved device will be readily understood, and it will be seen that I have provided a simple and efficient cotton chopper which will satisfactorily protect certain of the plants in the rows from earth being thrown thereover by the cultivator while leaving the other plants and weeds exposed so that the earth may fall thereon to destroy the same, my device thus proving extremely efficient for the desired purpose.

I claim:

1. The combination with a cultivator, of an attachment therefor, comprising a pair of spaced plates, rods radiating from the plates, rims secured to the ends of the rods, and arcuate plates having their intermediate portions secured to and connecting the plates and having their ends extending to the rims and disposed adjacent each other to inclose a space for receiving the plants to be protected thereby.

2. A cotton chopper, comprising cruciform plates having arcuate edges connecting their arms, rods projecting from the arms of the plates, a rim secured to the rods of each plate, an axle rotatably engaged in the plates, means for holding the plates in spaced relation, and arcuate plates having their intermediate portions secured to and connecting the arcuate edges of the cruciform plates and having their ends extending outward beyond the ends of the arms of the cruciform plates.

3. A cotton chopper, comprising a rotatable member including a plurality of plates so connected as to provide radially disposed receiving recesses having their front and rear inclosing walls extending outward a greater distance than their lateral inclosing walls.

In testimony whereof I affix my signature, in the presence of two witnesses.

ROBERT H. BRYANT.

Witnesses:
A. J. FLUKE,
H. E. COLEMAN.

---

Copies of this patent may be obtained for five cents each, by addressing the "Commissioner of Patents, Washington, D. C."